(12) United States Patent
Jeong (10) Patent No.: US 7,424,994 B2
(45) Date of Patent: Sep. 16, 2008

(54) MONITOR AND A MONITOR SUPPORTING APPARATUS

(75) Inventor: Jun-soo Jeong, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 407 days.

(21) Appl. No.: 10/912,291

(22) Filed: Aug. 6, 2004

(65) Prior Publication Data

US 2005/0029414 A1 Feb. 10, 2005

(30) Foreign Application Priority Data

Aug. 6, 2003 (KR) .................. 10-2003-0054263

(51) Int. Cl.
 *E04G 3/00* (2006.01)
(52) U.S. Cl. .................. 248/278.1; 248/276.1; 248/917
(58) Field of Classification Search ......... 248/917–924; 361/681, 683, 682
See application file for complete search history.

(56) References Cited

U.S. PATENT DOCUMENTS

| | | | |
|---|---|---|---|
| 5,854,735 A | 12/1998 | Cheng | |
| 6,231,021 B1 | 5/2001 | Hong | |
| 6,443,408 B1 | 9/2002 | Hung | |
| 6,478,275 B1 * | 11/2002 | Huang | 248/284.1 |
| 6,510,049 B2 * | 1/2003 | Rosen | 361/681 |
| 6,517,040 B1 * | 2/2003 | Wen | 248/278.1 |
| 6,609,272 B1 * | 8/2003 | Lee | 16/307 |
| 7,177,144 B2 * | 2/2007 | Ha et al. | 361/681 |
| 2004/0021051 A1 * | 2/2004 | Chiu | 248/371 |

FOREIGN PATENT DOCUMENTS

| | | |
|---|---|---|
| CN | 1420502 | 5/2003 |
| EP | 1 312 851 | 5/2003 |
| JP | 2000-66612 | 3/2000 |
| JP | 2001-050244 | 2/2001 |
| JP | 2001-142408 | 5/2001 |
| KR | 20-0295981 | 11/2002 |

OTHER PUBLICATIONS

Chinese Office Action for Application No. 200410069908.4 dated Aug. 4, 2006.
European Search Report issued for App. No. 04103694.7-1252, 4 pages.

\* cited by examiner

*Primary Examiner*—Amy J. Sterling
(74) *Attorney, Agent, or Firm*—Staas & Halsey LLP (57) ABSTRACT

A monitor having a monitor body to display a picture, and a base member to support the monitor body. The monitor includes a link member provided between the monitor body and the base member; a base hinge to rotatably connect the link member and the base member to enable the link member to rotate relative to a surface of the base member; a monitor hinge spaced from the base hinge to rotatably combine the link member and the monitor body; and a rotating limiter provided between the link member and the base member to prevent a lower part of the monitor body from making contact with the base member or an installing surface of the base member when the link member rotates against the base member. Accordingly, the monitor according to an aspect of the present invention prevents the lower part of the monitor body from making contact with the base member when the height of the monitor body is adjusted, and is convenient to use as the monitor body can be tilted relative to the base member. Further, package size of the monitor is reduced to decrease transportation expense upon delivery because the monitor body can be folded to be parallel to the base member.

44 Claims, 12 Drawing Sheets

MONITOR AND A MONITOR SUPPORTING APPARATUS

CROSS-REFERENCE TO RELATED APPLICATIONS

This application claims the benefit of Korean Patent Application No. 2003-54263, filed Aug. 6, 2003, in the Korean Intellectual Property Office, the disclosure of which is incorporated herein by reference.

BACKGROUND OF THE INVENTION

1. Field of the Invention

The present invention relates to a monitor, more particularly, to a monitor having an improved pivot structure of a monitor body relative to a base member.

2. Description of the Related Art

Generally, a monitor comprises a monitor body to display a picture, and a base member placed on a surface such as a table to support the monitor body.

Recently, a display apparatus having reduced thickness relative to a display area such as a Liquid Crystal Display (LCD) has been manufactured and is now being widely used.

Figure 1:
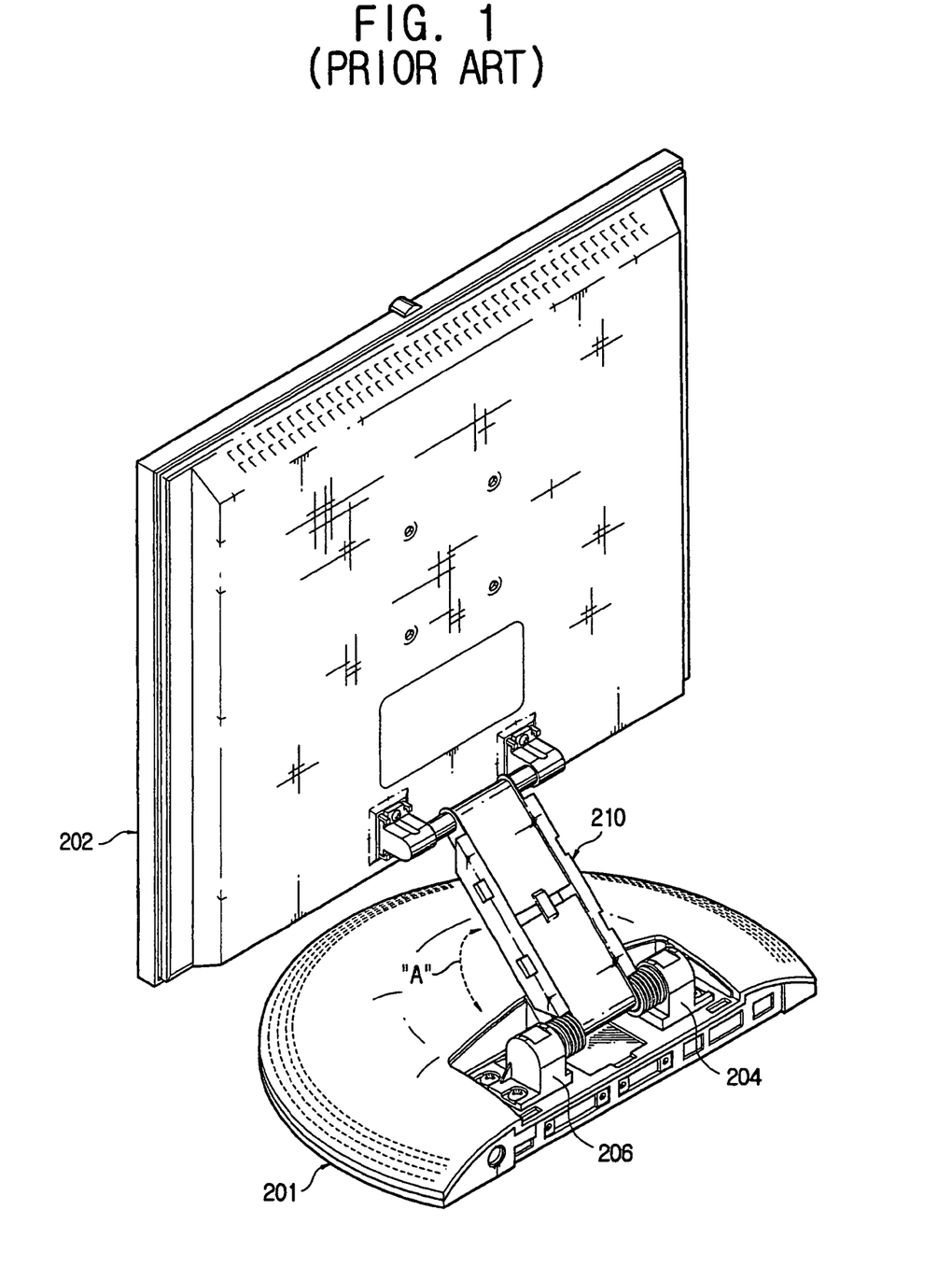
FIG. 1 is a rear perspective view of a conventional monitor.

As illustrated in FIG. 1, a conventional monitor comprises: a base member 201 placed on a surface such as a table, a monitor body 202 installed with an LCD to display a picture, and a connecting member 210 to link the base member 201 and the monitor body 202.

A bottom portion of the connecting member 210 is rotatably supported by a pair of supporting brackets 204 and 206 combined to the base member 201, while a top portion of the connecting member 210 is combined to the monitor body 202.

Accordingly, the monitor body 202 of the conventional monitor has adjustable height due to rotation of the connecting member 210, which allows the monitor body 202 to move up and down relative to the base member 201 as indicated by arrow "A" in FIG. 1.

However, although the monitor body 202 of the conventional monitor has adjustable height, a bottom portion of the monitor body 202 may make contact with the base member 201 or the surface on which the base member 201 is placed on when the monitor body 202 is pushed downward.

In addition, the conventional monitor is inconvenient to use because the conventional monitor is not provided with a tilting function to enable the monitor body 202 to rotate about a transverse axis of the monitor body 202 relative to the connecting member 210, and is not provided with a pivoting function to enable the monitor body 202 to pivot about an axis along a front-to-rear direction of the monitor body 202 relative to the connecting member 210. Further, the conventional monitor presents a problem when packaging for delivery, thus, increasing transportation expenses because the monitor body 202 can not be folded parallel to a surface of the base member 201.

SUMMARY OF THE INVENTION

Accordingly, it is an aspect of the present invention to provide a monitor to prevent a bottom portion of a monitor body from making contact with a base member or a surface on which the base member is placed when the height of the monitor body is adjusted, and a monitor capable of tilting the monitor body relative to the base member, thus, decreasing delivery expenses by reducing packaged size of the monitor.

Also, it is another aspect of the present invention to provide a monitor having a monitor body that pivots relative to a base member.

Additional aspects and advantages of the invention will be set forth in part in the description which follows and, in part, will be obvious from the description, or may be learned by practice of the invention.

The foregoing and/or other aspects of the present invention are achieved by providing a monitor comprising: a monitor body to display a picture; a base member to support the monitor body; a link member provided between the monitor body and the base member; a base hinge to rotatably connect the link member and the base member to enable the link member to rotate relative to a surface of the base member; a monitor hinge spaced from the base hinge to rotatably combine the link member and the monitor body; and a rotating limiter provided between the link member and the base member to prevent a lower part of the monitor body from making contact with the base member or a surface on which the base member is placed when the link member rotates against the base member.

According to an aspect of the invention, the monitor further comprises: a base bracket combined to the base member and the base hinge to support the base hinge.

According to another aspect of the invention, the rotating limiter comprises: a stopping protrusion provided on the link member; and a stopper provided on the base bracket to make contact with the stopping protrusion to stop rotation of the link member.

According to an aspect of the invention, the base bracket is formed with a stopper accommodation part to support the stopper when the stopper exits and enters the stopper accommodation part; and an elastic member to elastically push the stopper, provided between the stopper and the stopper accommodation part.

According to an aspect of the invention, the stopping protrusion surmounts an elastic force of the elastic member to enable the link member to rotate to a position parallel to the surface of the base member when the link member is pushed, and the stopping protrusion makes contact with the stopper.

According to an aspect of the invention, the monitor body further comprises a pivoting hinge to pivotably combine the monitor body and the monitor hinge to enable the monitor body to pivot relative to the monitor hinge.

According to an aspect of the invention, the monitor further comprises a main body bracket provided between the pivoting hinge and the monitor hinge.

According to an aspect of the invention, a first side of the main body bracket is combined to the monitor hinge to enable the monitor body to rotate relative to the link member, and a second side of the main body bracket is combined to the pivoting hinge to enable the monitor body to pivot relative to the main body bracket.

According to an aspect of the invention, the pivoting hinge comprises: a monitor bracket having a first side combined to the monitor body and a second side formed with a pivoting shaft protruding backward; and a pivoting bracket having a first part formed with a shaft accommodation part pivotably combined with the pivoting shaft, and a second part combined with the main body bracket.

According to an aspect of the invention, the pivoting shaft is of a cylindrical hollow shape in a middle area of the monitor bracket with an edge of the cylindrical hollow protruding backward.

According to an aspect of the invention, a bending part is formed on an end of the pivoting shaft to provide a pivoting friction force between the monitor bracket and the pivoting bracket by pressing against a rear edge of the shaft accommodation part.

According to an aspect of the invention, a washer is provided between the monitor bracket and the pivoting bracket or between the pivoting bracket and the bending part, or at both places.

According to an aspect of the invention, the pivoting hinge further comprises a pivoting angle limiter to limit a pivoting angle range of the monitor bracket relative to the pivoting bracket.

According to an aspect of the invention, the pivoting angle limiter comprises: a protrusion protruding backward from the monitor bracket; and a protrusion guiding part provided on the pivoting bracket and pivotably guide the protrusion within a predetermined angle range.

According to an aspect of the invention, the pivoting angle range of the monitor bracket relative to the pivoting bracket ranges from 0 to 180 degrees.

BRIEF DESCRIPTION OF THE DRAWINGS

The above and/or other aspects and advantages of the invention will become apparent, and more readily appreciated from the following description of the preferred embodiments, taken in conjunction with the accompany drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout.

The present invention will be described in reference to a monitor having a monitor body with a flat display panel, for example, such as an LCD or a Plasma Display Panel (PDP).

As illustrated in FIGS. 2 through 7, a monitor 1 according to an aspect of the present invention comprises: a monitor body 3 to display a picture, a base member 5 to support the monitor body 3, a link member 10 provided between the monitor body 3 and the base member 5, a base hinge 40 to rotatably link the link member 10 to the base member 5 and enable the link member 10 to rotate relative to a surface of the base member 5, a monitor hinge 50 spaced from the base hinge 40 to rotatably link the link member 10 to the monitor body 3, and a rotating limiter 60 (shown in FIG. 6) provided between the link member 10 and the base member 5 to prevent contact between a bottom portion of the monitor body 3 and the base member 5 or an installing surface of the base member 5 when the link member 10 rotates relative to the base member 5. In addition, the monitor 1 according to an aspect of the present invention further comprises: a pivoting hinge 70 to pivotably link the monitor body 3 and the monitor hinge 50 to enable the monitor body 3 to pivot relative to the monitor hinge 50, and a main body bracket 30 (shown in FIG. 3) provided between the pivoting hinge 70 and the monitor hinge 50.

Figure 2:
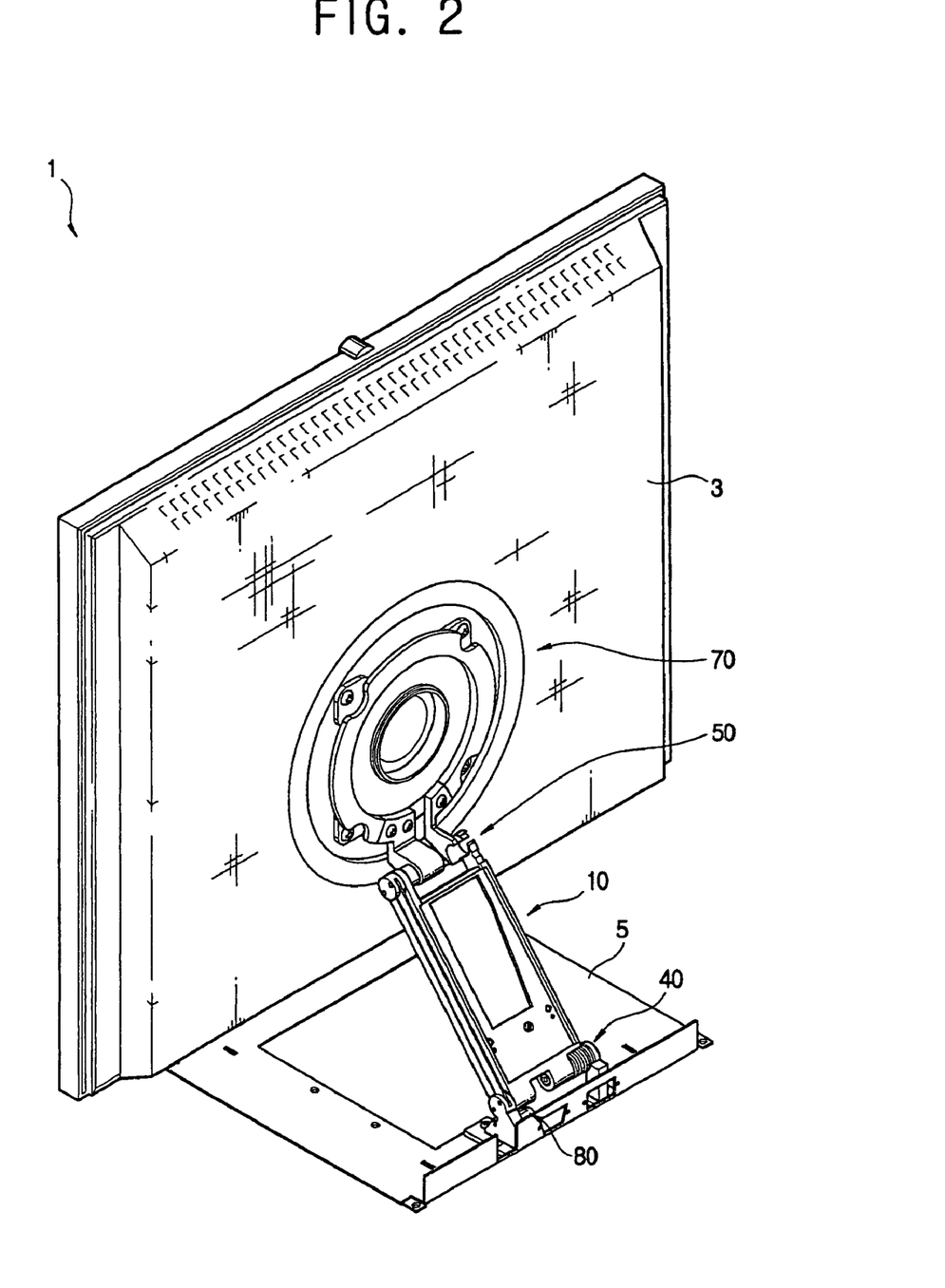
FIG. 2 is a rear perspective view of a monitor according to an aspect of the present invention.
Figure 3:
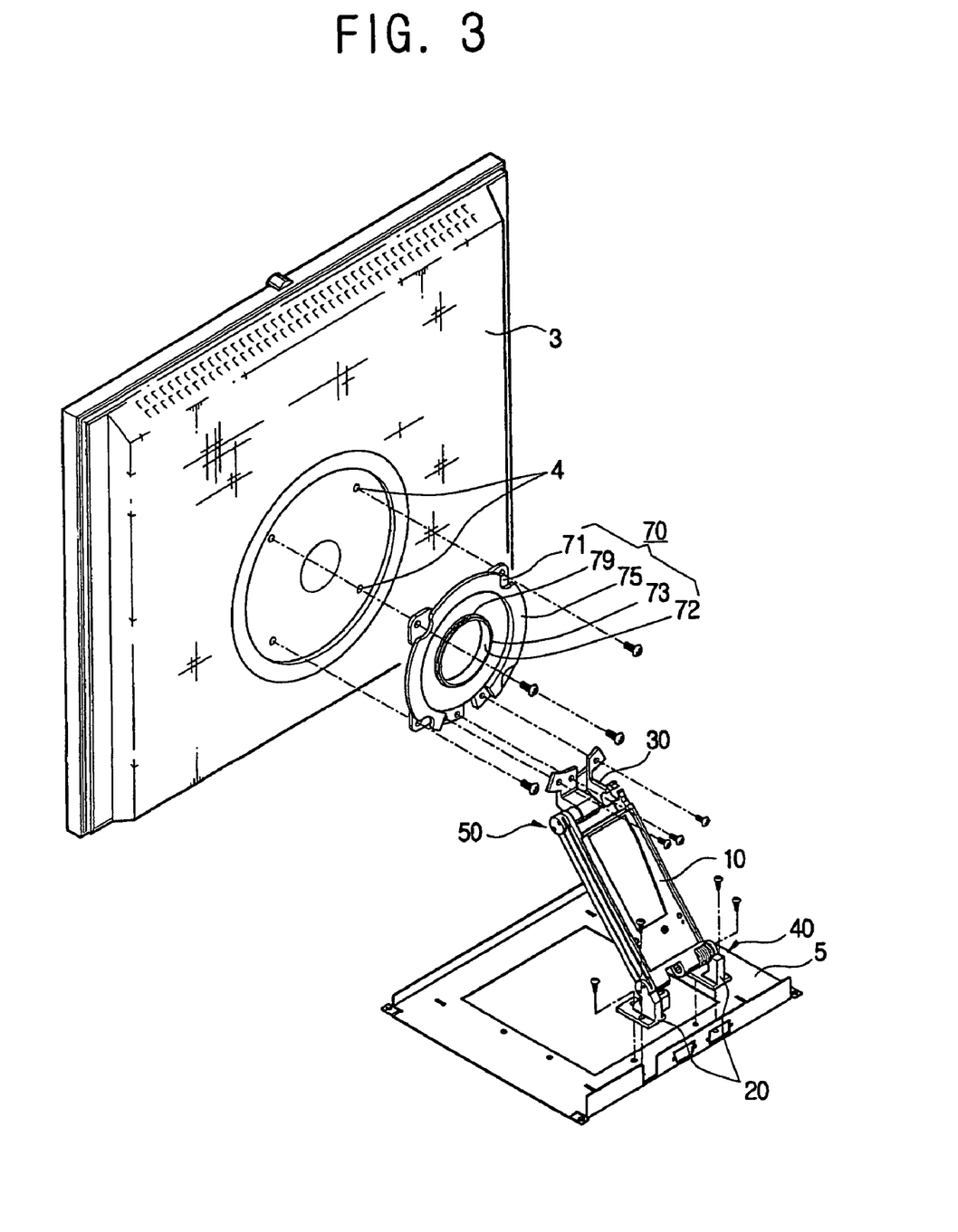
FIG. 3 is a partial exploded perspective view of the monitor according to an aspect of the present invention.

The monitor body 3 is provided with a flat display panel such as the LCD, the PDP, or similar display panels to display the picture.

The base member 5 is placed on a surface such as a table to support the monitor body 3. As shown in FIG. 3, on top of the base member 5 is provided a base bracket 20 combined with the base member 5 and the base hinge 40 to support the base hinge 40.

Figure 5:
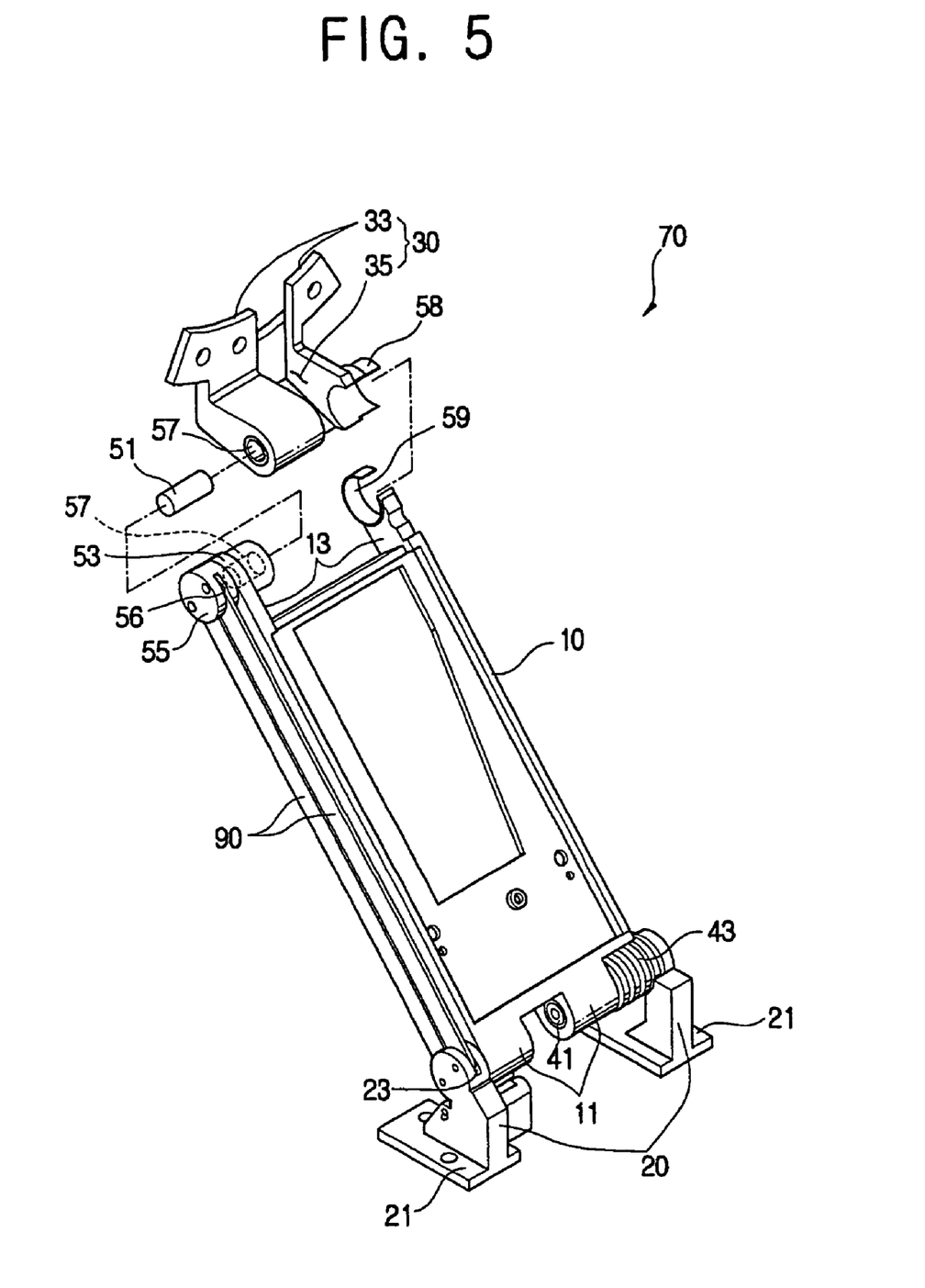
FIG. 5 is a perspective view of a link member of the monitor in FIG. 3.

The link member 10, which is shaped similar to a rectangular plate comprises: a lower part 11 combined with the base hinge 40, and an upper part 13 combined with the monitor hinge 50. Further, the link member 10 is provided with a cable guiding part (not shown) to accommodate and guide a cable (not shown) that connects the base member 5 to the monitor body 3 and transfers an image signal.

According to an aspect of the invention, a pair of base brackets 20 are provided to be combined with opposite sides of the lower part 11 of the link member 10 and with the base hinge 40. Further, a bottom portion of the base bracket 20 is provided with a base combining part 21 screw-combined with the base member 5 by a screw, while a top of the base bracket 20 is formed with a first link support 23 to rotatably support an auxiliary link member 90. In addition, at least one of the pair of base brackets 20 is formed with a stopper accommodation part 25 to accommodate a stopper 63.

A top portion of the main body bracket 30 is provided with a pivoting combining part 33 screw-combined to a pivoting bracket 75 of the pivoting hinge 70, while a bottom portion of the main body bracket 30 is combined to the monitor hinge 50 to allow rotation relative to the link member 10. Further, the main body bracket 30 is formed with a cable accommodation part 35 to accommodate the cable to connect the monitor body 3 and the base member 5.

Figure 6:
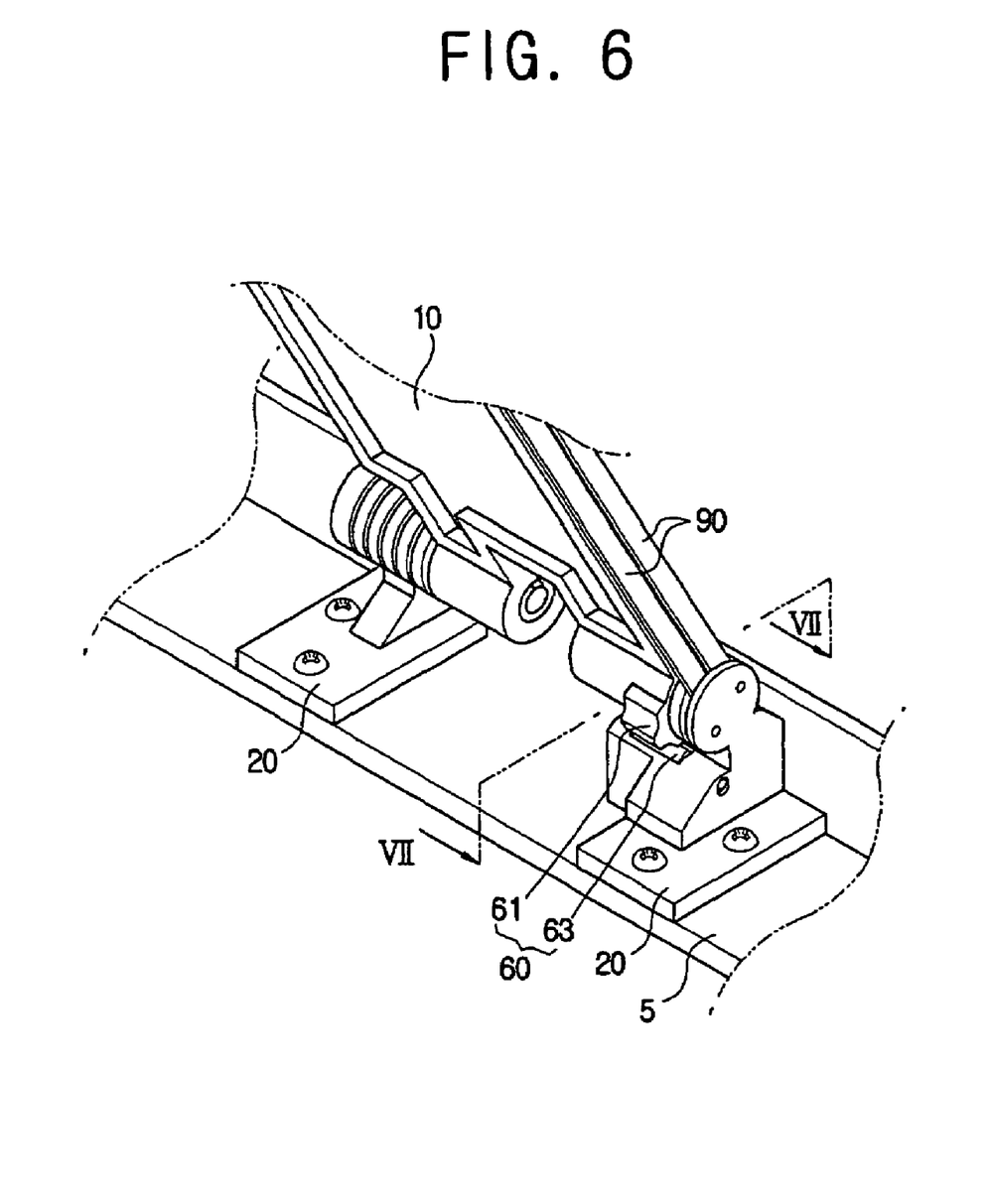
FIG. 6 is a perspective view of a rotating limiter of the monitor in FIG. 5.

As shown in FIG. 6, the rotating limiter 60 comprises: a stopping protrusion 61 formed on the link member 10, and a stopper 63 provided to the base bracket 20 to make contact with the stopping protrusion 61 to stop rotation of the link member 10 by pressing against the stopping protrusion 61.

The stopping protrusion 61 is formed to protrude at least on the lower part 11 of the link member 10.

Figure 7:
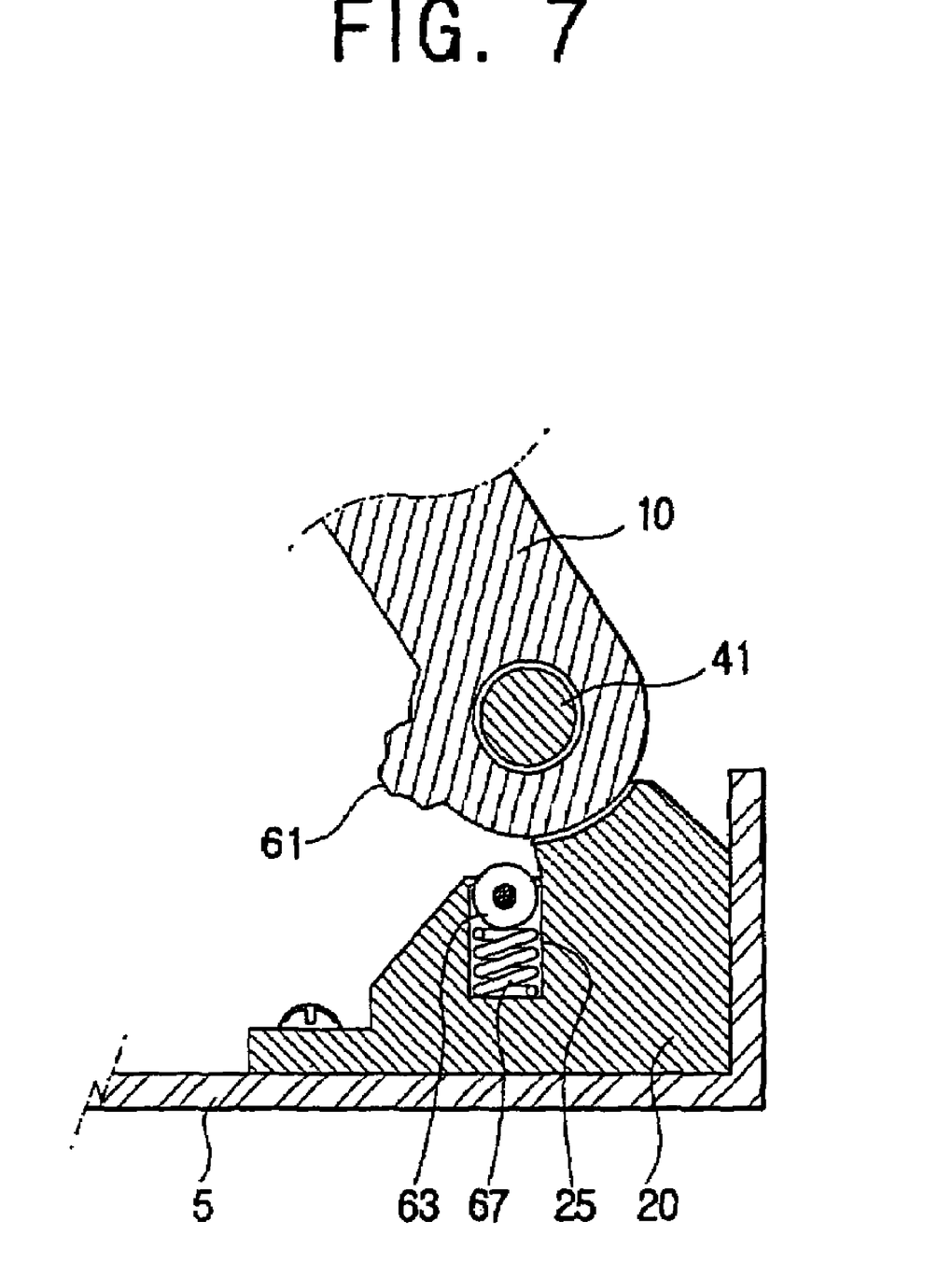
FIG. 7 is a cross-sectional view taken along the VII-VII line of the rotating limiter of the monitor in FIG. 6.

The stopper 63 is provided to enter and exit the stopper accommodation part 25 provided on the base bracket 20. Further, an elastic member 67 to push the stopper 63 with an elastic force is provided between the stopper 63 and the stopper accommodation part 25.

According to an aspect of the present invention, the elastic member 67 is a coil spring having a predetermined elastic force to push the stopper 63 upward. Further, the elastic force of the elastic member 67 is set to a degree so that the stopping protrusion 61 on the link member 10 which rotates when the link member 10 is pushed downward can be stopped by the stopper 63, and such that the stopping protrusion 61 can pass by the stopper 63 pushing the stopper 63 downward as the link member 10 is further pushed downward.

Accordingly, when the link member 10 is pushed and the stopping protrusion 61 makes contact with the stopper 63, the stopping protrusion 61 surmounts the elastic force of the elastic member 67 and passes by the stopper 63, causing the link member 10 to be parallel to the surface of the base member 5.

Figure 4:
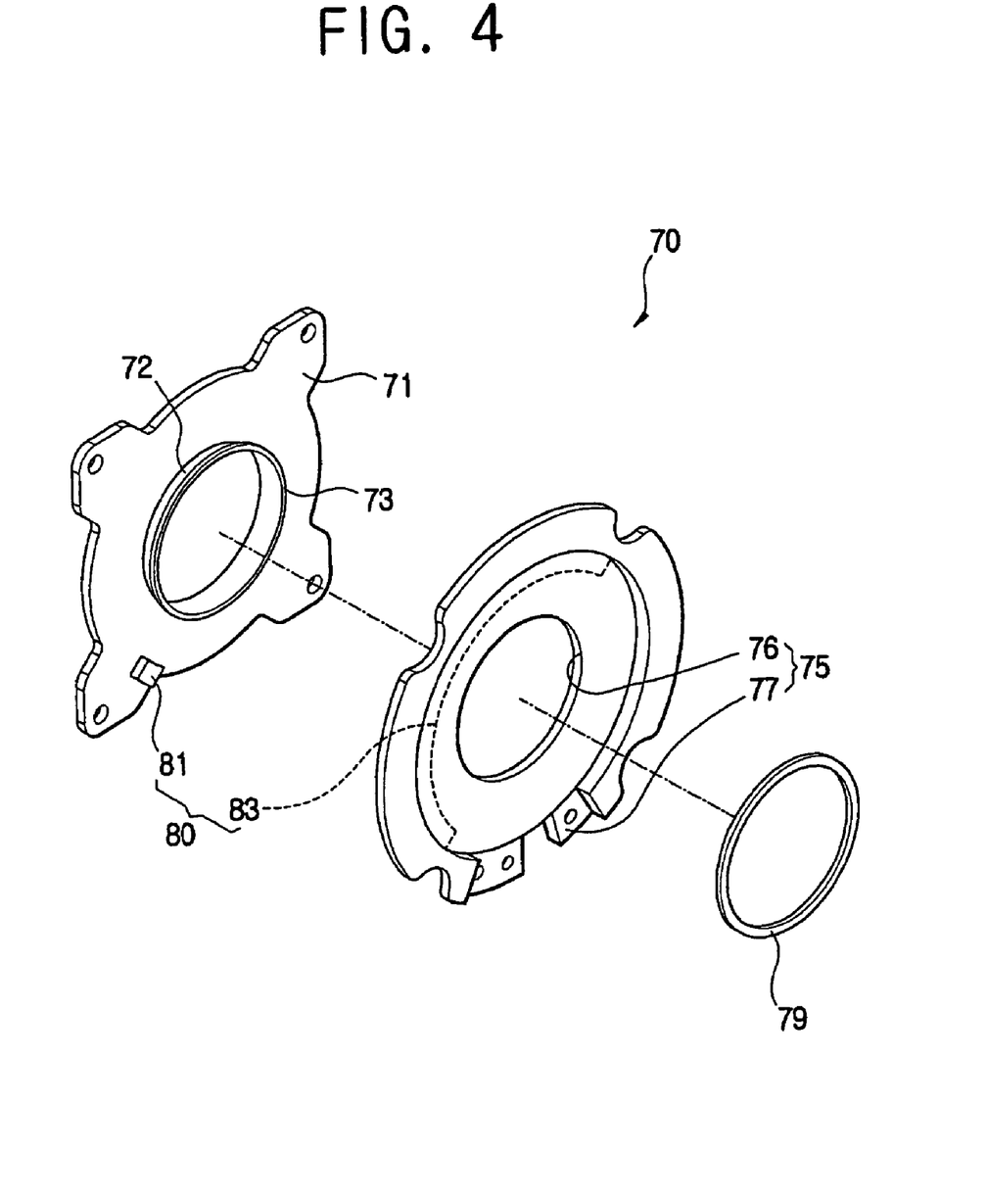
FIG. 4 is an exploded perspective view of a pivoting hinge of the monitor in FIG. 3.

The pivoting hinge 70 is provided between the monitor body 3 and the main body bracket 30 to enable the monitor body 3 to be rotated about an axis along a front-to-rear direction of the monitor body 3 relative to the main body bracket 30. Further, the pivoting hinge 70 comprises: a monitor bracket 71 combined to the monitor body 3, and a pivoting bracket 75 provided between the monitor bracket 71 and the main body bracket 30, rotatably combined with the monitor bracket 71.

A first side of the monitor bracket 71 is screw-combined to a combining part 4 provided to a rear of the monitor body 3, while a second side of the monitor bracket 71 is formed with a pivoting shaft 72 protruding backward.

A first part of the pivoting bracket 75 is formed with a shaft accommodation part 76 rotatably combined to the pivoting shaft 72, while a second part of the pivoting bracket 75 is formed with a main body bracket combining part 77 screw-combined with the pivoting combining part 33 of the main body bracket 30.

According to another aspect of the present invention, the pivoting shaft 72 is formed like a cylindrical hollow in a middle part of the monitor bracket 71 having an edge of the hollow protruding backward. Herein, the cylindrical hollow is preferably wide enough for the cable that connects the monitor body 3 and the base member 5 to pass through. An end of the pivoting shaft 72 is formed with a bending part 73 bent to press a rear edge of the shaft accommodation part 76 so that the monitor bracket 71 is closely in contact with the pivoting bracket 75 to generate rotational friction force. Further, at least one washer 79 is combined with the pivoting shaft 72.

The bending part 73 is formed when a rear end of the pivoting shaft 72 is pushed, and thereby, presses against the rear edge of the shaft accommodation part 76 of the pivoting bracket 75. Further, the rotational friction force generated when the bending part 73 is pressed is surmountable by a user as the user rotates the monitor body 3 with a predetermined force.

According to another aspect of the present invention, the washer 79 is provided between the monitor bracket 71 and the pivoting bracket 75 or between the pivoting bracket 75 and the bending part 73. The washer 79 may also be provided at both places. However, according to another aspect of the present invention, the washer 79 is provided between the pivoting bracket 75 and the bending part 73. Further, the washer 79 provides an elastic force to keep a proper rotation friction between the monitor bracket 71 and the pivoting bracket 75.

A pivoting angle limiter 80 comprises: a protrusion 81 protruding backward from the monitor bracket 71, and a protrusion guiding part 83 provided to the pivoting bracket 75 to rotatably guide the protrusion 81 within a predetermined angle range.

The protrusion 81 formed to protrude from the rear of the monitor bracket 71 is inserted into the protrusion guiding part 83 so that rotation can be limited when the protrusion 81 is blocked by the opposite ends of the protrusion guiding part 83.

The protrusion guiding part 83 is formed to be depressed in a shape of an arc of a circle on the front of the pivoting bracket 75 to accommodate the protrusion 81. Further, a pivoting angle range is determined according to an angle range of the opposite ends of the protrusion guiding part 83. According to an aspect of the present invention, the angle range of the opposite ends of the protrusion guiding part 83 ranges from 0 to 180 degrees. In other words, the pivoting angle range of the monitor bracket 71 relative to the pivoting bracket 75 ranges from 0 to 180 degrees. However, the protrusion may be formed on the front of the pivoting bracket 75 with the protrusion guiding part 83 formed on the rear of the monitor bracket 71. Further, the angle range of opposite ends of the protrusion guiding part may range from 0 to 90 degrees or may be set to a different range as necessary.

The base hinge 40 is provided between the lower part 11 of the link member 10 and the base bracket 20. According to an aspect of the present invention, the base hinge 40 comprises: a pair of first hinge axes 41 rotatably combined to the lower part 11 of the link member 10 and the pair of base brackets 20, and a twisting coil spring 43 having a first end combined to the link member 10 and a second end combined to the pair of base brackets 20.

The first hinge axis 41 is inserted into a side of the lower part 11 of the link member 10 and into a side of the base bracket 20 to enable the link member 10 to rotate up and down relative to the base member 5 due to the rotational friction force. Accordingly, the user can adjust the height of the monitor 3 relative to the base member 5 by pressing the link member 10 to rotate about the first hinge axis 41 relative to the base member 5. According to an aspect of the invention, the rotating friction force of the first hinge axis 41 is surmountable by the user when the user pushes the link member 10 with the predetermined force.

The twisting coil spring 43 has an elastic force applied in a direction opposite to a downward rotation of the monitor body 3 that is combined to the link member 10. Moreover, the elastic force of the twisting coil spring 43 is equal to the force of the weight of the monitor body 3 that rotates the link member 10 downward. Accordingly, the user can rotate the link member 10 easily relative to the base member 5 because the weight of the monitor body 3 is negated by the elastic force of the twisting coil spring 43. Further, the user can rotate the link member 10 up and down by pressing the link member 10 with the same force because the user only needs to surmount the rotational friction force of the first hinge axis 41 to rotate the link member 10 up and down relative to the base member 5.

The monitor hinge 50 is provided between the upper part 13 of the link member 10 and the main body bracket 30. According to an aspect of the present invention, the monitor hinge 50 comprises: a link support 55 having a second link support 56 combined to the auxiliary link member 90 and rotatably combined to a first side of the upper part 13 of the link member 10, a second hinge axis 51 rotatably combined to a first side of the link support 55 and a first side of the main body bracket 30, and a rotating shaft 58 provided to a second side of the main body bracket 30 and rotatably combined to a rotating shaft support 59 provided to a second side of the upper part 13 of the link member 10. According to another aspect of the invention, the monitor hinge 50 may further comprise: a spring member (not shown) combined to the link member 10 on a first side thereof and combined to the main body bracket 30 on a second side thereof to provide the elastic force applied in the direction opposite to a downward rotation of the monitor body 3 due to the weight of the monitor body 3.

The link support 55 is provided rotatably supported via a support accommodation part 53 provided to the first side of the upper part 13 of the link member 10.

The second hinge axeses 51 are rotatably inserted into a second shaft accommodation part 57 respectively provided on the first side of the link support 55 and the first side of the main body bracket 30 to provide the rotation friction force.

Accordingly, the main body bracket 30 combined to the monitor body 3 rotates about the second hinge axis 51 relative to the link member 10 when the user pushes the monitor body 3. Herein, the rotation friction force of the second hinge axis 51 is surmountable by the user when the user presses the monitor body 3 with the predetermined force.

According to another aspect of the invention, a pair of auxiliary link members 90, shaped like a rod, are provided to a first side of the link member 10. Further, the auxiliary link member 90 is rotatably combined to the first link support 23 and the second link support 56. The auxiliary link member 90 is installed on the first link support 23 and the second link support 56 to be deviated from an axis of the first hinge axis 41 and the second hinge axis 51.

Accordingly, when the link member 10 is pushed to rotate up and down relative to the base member 5, the main body bracket 30 is rotated along the link support 55 via the auxiliary link members 90. In other words, when the link member 10 rotates downward, the link support 55 and the main body bracket 30 rotate backward, eventually rotating the monitor body 3 backward. And when the user tries to push and tilt only the main body bracket 30 relative to the link member 10 without rotating the link member 10, only the main body bracket 30 rotates as the force applied to rotate the main body bracket 30 surmounts the rotation friction force formed between the second hinge axis 51 and the second shaft accommodation part 57, while the link support 55 does not rotate with the auxiliary link member 90.

Hereinbelow, an operation of the monitor according to an aspect of the present invention will be described in reference to FIGS. 8 through 12.

Figure 8:
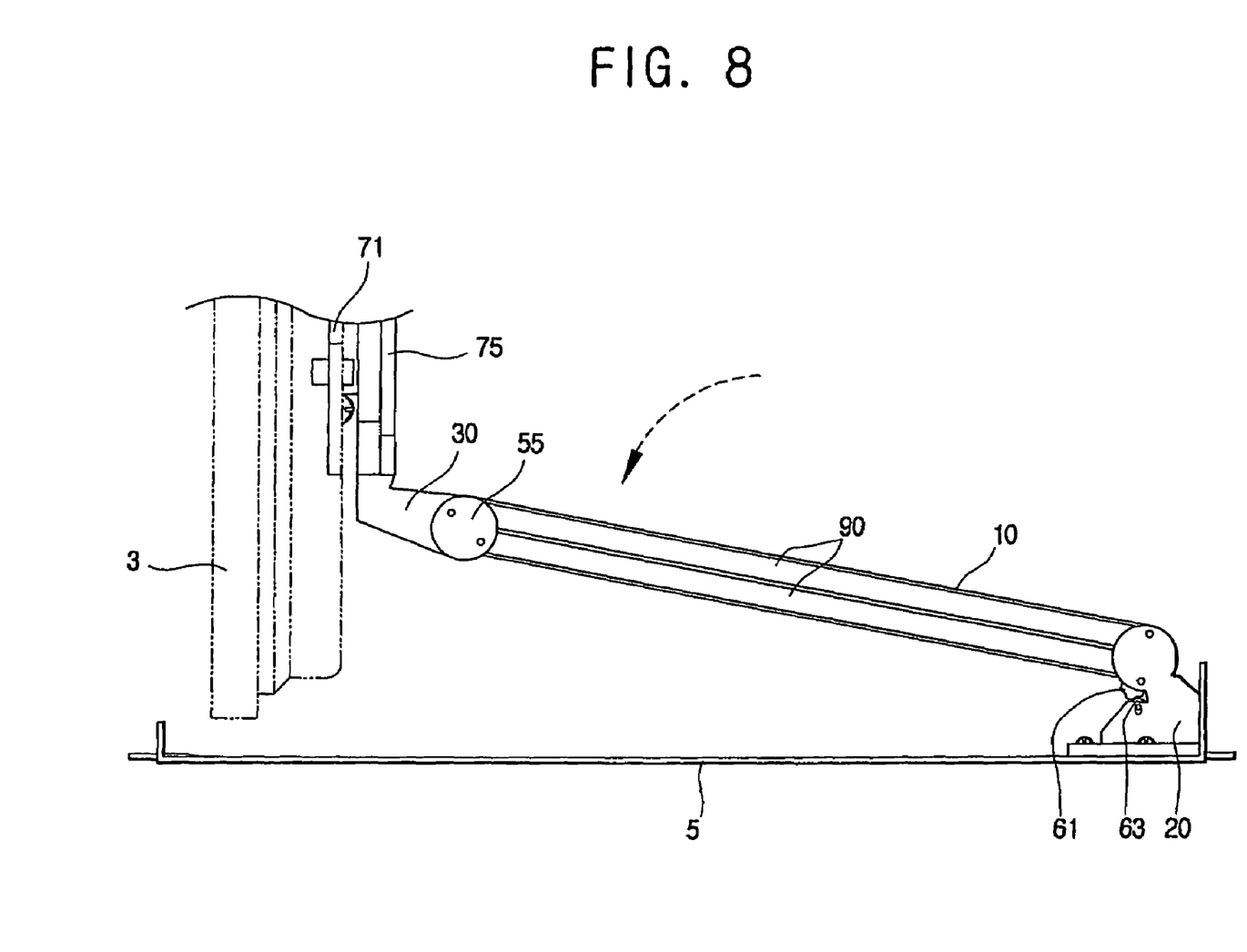
FIGS. 8 through 10 are side views of the monitor body and link member of the monitor according to another aspect of the present invention.
Figure 9:
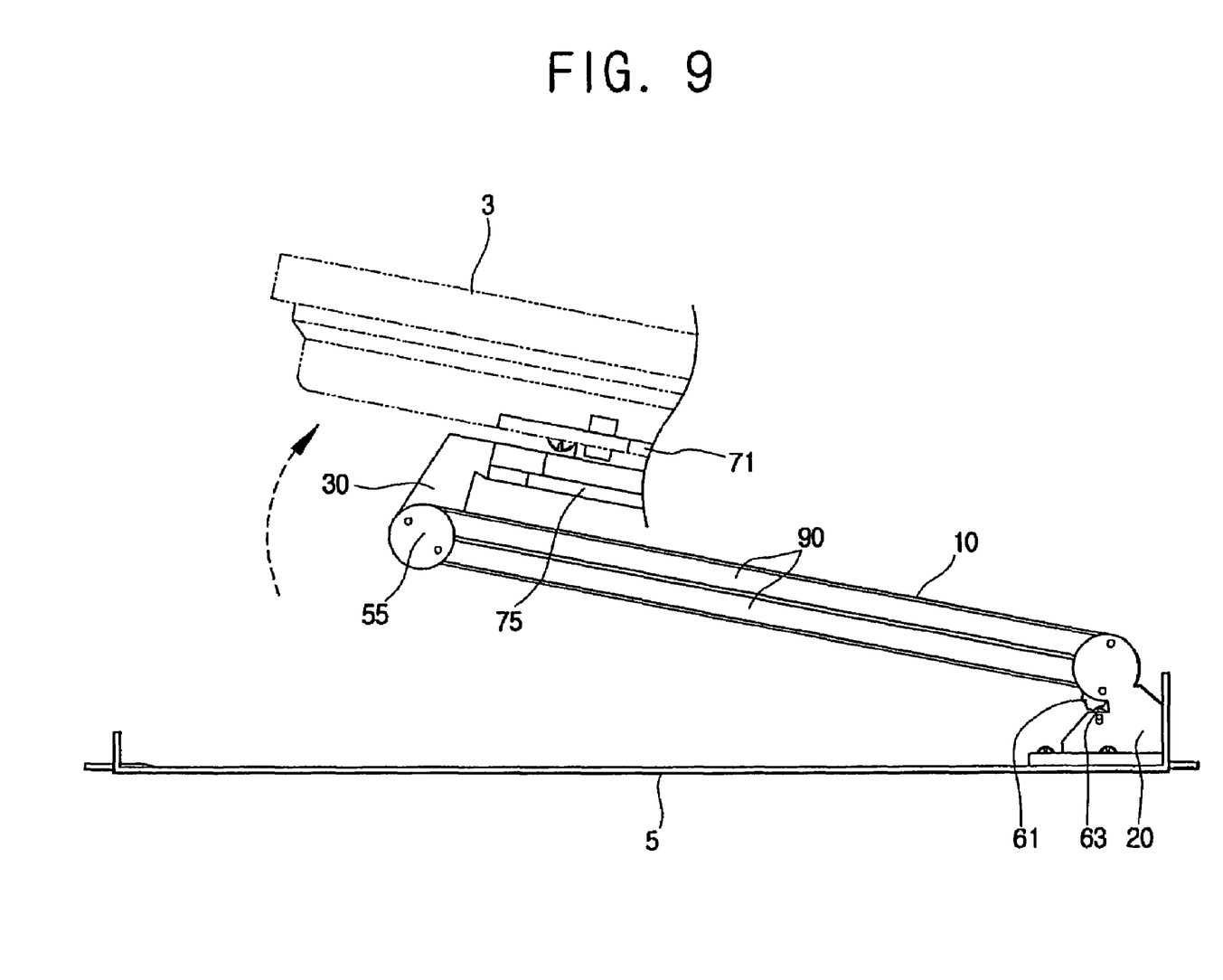
Figure 10:
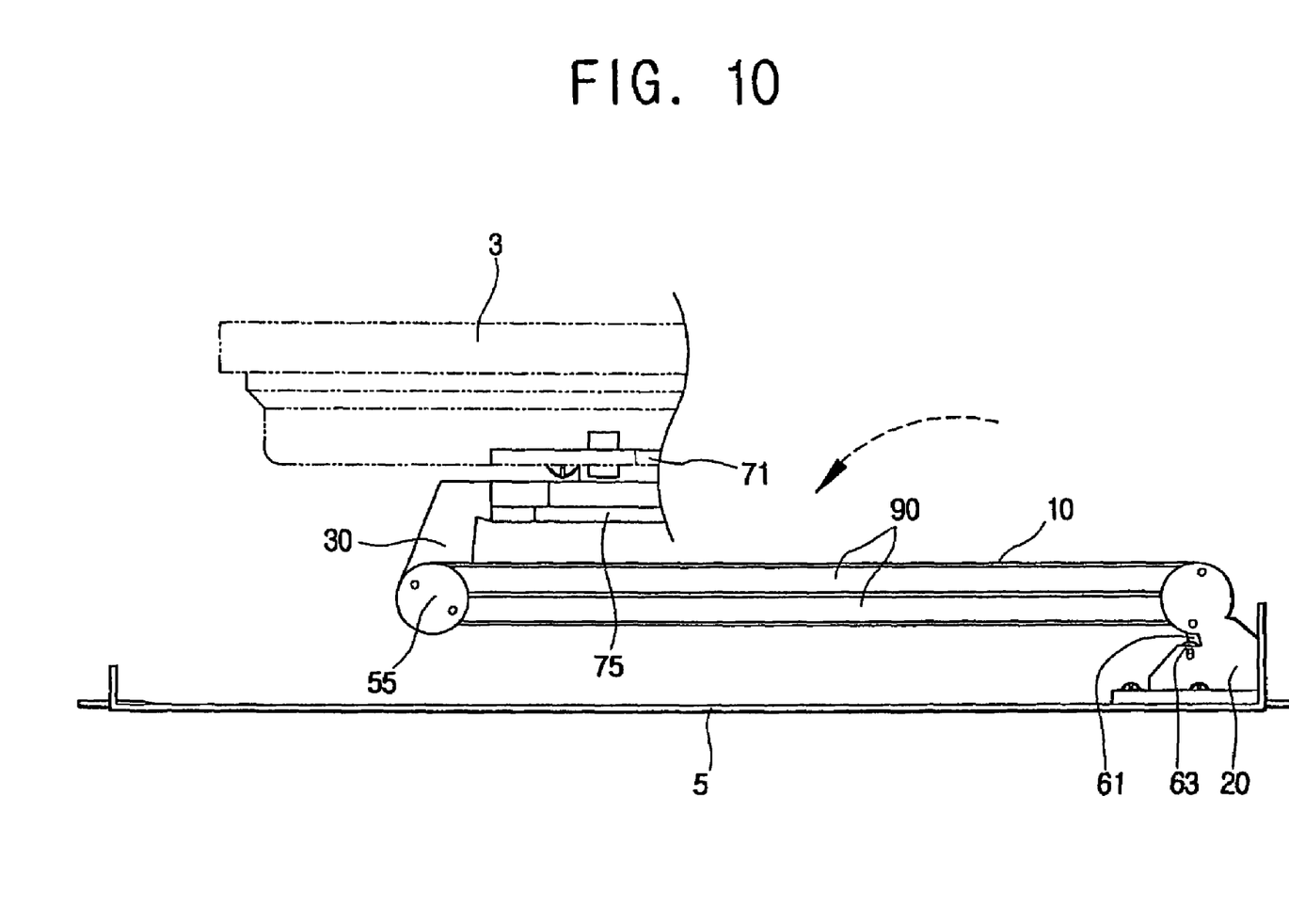

When a user wants to fold the monitor body 3 to be parallel to the base member 5 and the monitor body 3 shown in FIG. 2 is pushed downward, the stopping protrusion 61 provided to link member 10 stops rotating as the stopping protrusion 61 is blocked by the stopper 63 provided on the base bracket 20 before the lower part of the monitor body 3 makes contact with the base member 5 as shown in FIG. 8. The monitor body 3 can be pushed to tilt backward and to be parallel to the surface of the link member 10. (Refer to FIG. 9) Accordingly, if the monitor body 3 is pushed downward further, the stopping protrusion 61 surmounts the elastic force of the elastic member 67 and passes by the stopper 63 to allow the monitor body 3 to be folded parallel to the base member 5. (Refer to FIG. 10)

Figure 11:
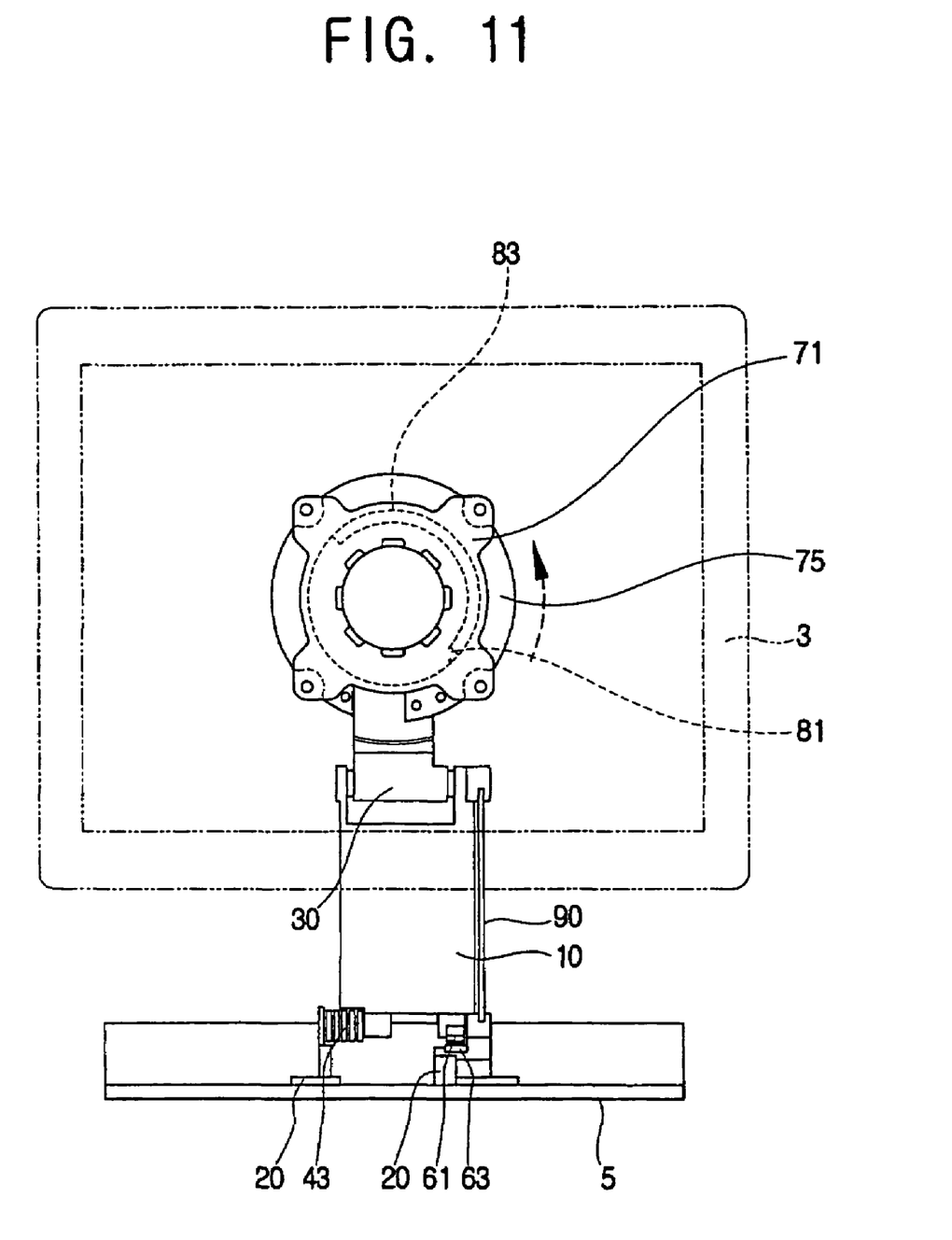
FIGS. 11 and 12 are front views of the monitor body of the monitor according to an aspect of the present invention.
Figure 12:
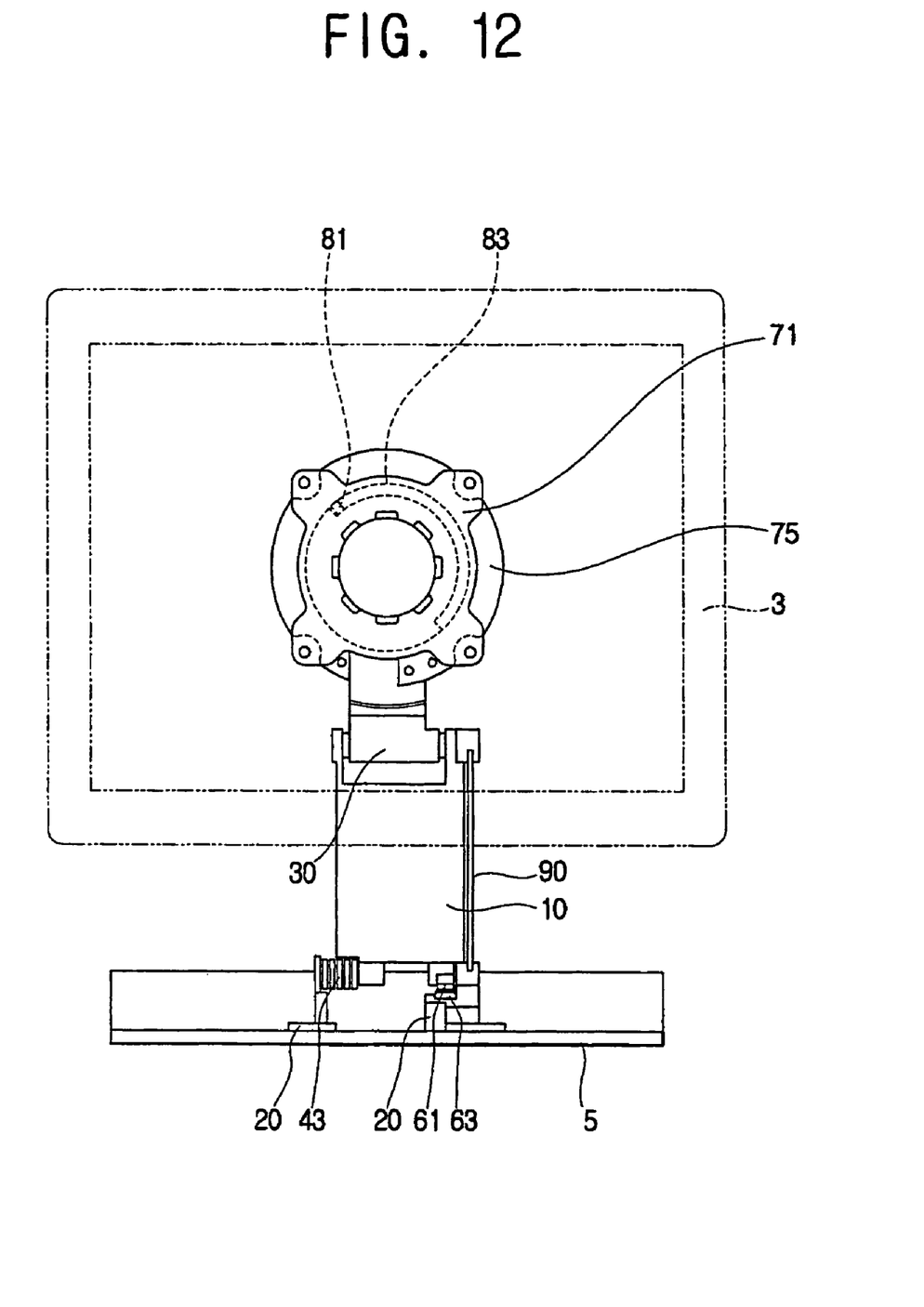

According to an aspect of the invention, the monitor body 3 pivots relative to the main body bracket 30. FIG. 11 illustrates the monitor body 3 that rotates about the pivoting shaft 72. Accordingly, the protrusion 81 rotates along the protrusion guiding part 83. Herein, a pivoting range of the monitor body 3 relative to the main body bracket 30 ranges from 0 to 180 degrees because the angle range of the opposite ends of the protrusion guiding part 83 ranges from 0 to 180 degrees. (Refer to FIG. 12) Thus, picture displayed on the monitor body 3 can be easily viewed by the user from the rear of the monitor 1 when the monitor body 3 is pivoted to 180 degrees relative to the main body bracket 30, and when the monitor body 3 is folded to be parallel to the base member 5.

Accordingly, the monitor according to an aspect of the present invention can prevent the lower part of the monitor body from making contact with the base member when the height of the monitor body is adjusted, and is convenient to use because the monitor body can be tilted relative to the base member. Further, package size of the monitor is reduced to decrease transportation expense upon delivery as the monitor body can be folded to be parallel to the base member.

Although a few embodiments of the present invention have been shown and described, it would be appreciated by those skilled in the art that changes may be made in these embodiments without departing from the principles and spirit of the invention, the scope of which is defined in the appended claims and their equivalents.

What is claimed is:

1. A monitor, comprising:
    a monitor body to display a picture;
    a base member to support the monitor body;
    a link member provided between the monitor body and the base member;
    a base hinge to rotatably connect the link member and the base member and enable the link member to rotate relative to a surface of the base member, the base hinge having a base hinge axis;
    a monitor hinge, spaced from the base hinge, to rotatably combine the link member and the monitor body;
    a rotating limiter, provided between the link member and the base member, to prevent a lower part of the monitor body from making contact with the base member when the link member rotates against the base member; and
    a pivoting hinge to pivotably combine the monitor body and the monitor hinge to enable the monitor body to pivot relative to the monitor hinge, the pivoting hinge having a pivoting hinge axis transverse with respect to the base hinge axis.

2. The monitor according to claim 1, further comprising:
    a base bracket, combined to the base member and the base hinge, to support the base hinge.

3. The monitor according to claim 2, wherein the rotating limiter further comprises:
    a stopping protrusion provided on the link member; and a stopper provided on the base bracket, to make contact with the stopping protrusion to stop rotation of the link member.

4. The monitor according to claim 3, wherein the base bracket further comprises:
    a stopper accommodation part to support the stopper when the stopper enters and exits the stopper accommodation part; and
    an elastic member to elastically push the stopper provided between the stopper and the stopper accommodation part.

5. The monitor according to claim 4, wherein the stopping protrusion surmounts an elastic force of the elastic member to enable the link member to rotate to a position parallel to the surface of the base member when the link member is pushed and the stopping protrusion makes contact with the stopper.

6. The monitor according to claim 1, further comprising:
    a main body bracket provided between the pivoting hinge and the monitor hinge.

7. The monitor according to claim 6, wherein a first side of the main body bracket is combined to the monitor hinge to enable the monitor body to rotate relative to the link member, and
    a second side of the main body bracket is combined to the pivoting hinge to enable the monitor body to pivot relative to the main body bracket.

8. The monitor according to claim 7, wherein the pivoting hinge further comprises:
    a monitor bracket having a first side combined to the monitor body;
    a pivoting shaft that protrudes away from the monitor body provided to a second side of the monitor; and a pivoting bracket having a first part formed with a shaft accommodation part pivotably combined with the pivoting shaft, and a second part combined with the main body bracket.

9. The monitor according to claim 8, wherein the pivoting shaft is of a cylindrical hollow shape in a middle area of the monitor bracket with an edge of the cylindrical hollow protruding backward.

10. The monitor according to claim 9, further comprising:
a bending part formed on an end of the pivoting shaft, to provide a pivoting friction force between the monitor bracket and the pivoting bracket when a rear edge of the shaft accommodation part is pushed.

11. The monitor according to claim 10, wherein further comprising:
a washer provided between the monitor bracket and the pivoting bracket and/or between the pivoting bracket and the bending part.

12. The monitor according to claim 3, wherein the monitor body further comprises:
a pivoting hinge to pivotably combine the monitor body and the monitor hinge, to enable the monitor body to pivot relative to the monitor hinge.

13. The monitor according to claim 12, further comprising:
a main body bracket provided between the pivoting hinge and the monitor hinge.

14. The monitor according to claim 13, wherein a first side of the main body bracket is combined to the monitor hinge to enable the monitor body to rotate relative to the link member, and
a second side of the main body bracket is combined to the pivoting hinge to enable the monitor body to pivot relative to the main body bracket.

15. The monitor according to claim 14, wherein the pivoting hinge further comprises:
a monitor bracket having a first side combined to the monitor body;
a pivoting shaft that protrudes away from the monitor body provided to a second side of the monitor bracket; and
a pivoting bracket having a first part formed with a shaft accommodation part pivotably combined with the pivoting shaft, and a second part combined with the main body bracket.

16. The monitor according to claim 15, wherein the pivoting shaft is of a cylindrical hollow shape in a middle area of the monitor bracket with an edge of the cylindrical hollow protruding backward.

17. The monitor according to claim 16, further comprising:
a bending part formed on an end of the pivoting shaft to provide a pivoting friction force between the monitor bracket and the pivoting bracket by pushing a rear edge of the shaft accommodation part.

18. The monitor according to claim 17, further comprising:
a washer provided between the monitor bracket and the pivoting bracket and/or between the pivoting bracket and the bending part.

19. The monitor according to claim 8, wherein the pivoting hinge further comprises:
a pivoting angle limiter to limit a pivoting angle range of the monitor bracket relative to the pivoting bracket.

20. The monitor according to claim 19, wherein the pivoting angle limiter further comprises:
a protrusion protruding backward from the monitor bracket; and
a protrusion guiding part provided to the pivoting bracket, to pivotably guide the protrusion within a predetermined angle range.

21. The monitor according to claim 20, wherein the pivoting angle range of the monitor bracket relative to the pivoting bracket ranges from 0 to 180 degrees.

22. The monitor according to claim 15, wherein the pivoting hinge further comprises:
a pivoting angle limiter to limit a pivoting angle range of the monitor bracket relative to the pivoting bracket.

23. The monitor according to claim 22, wherein the pivoting angle limiter comprises:
a protrusion protruding backward from the monitor bracket; and
a protrusion guiding part provided to the pivoting bracket, to pivotably guide the protrusion within a predetermined angle range.

24. The monitor according to claim 23, wherein the pivoting angle range of the monitor bracket relative to the pivoting bracket ranges from 0 to 180 degrees.

25. The monitor according to claim 2, further comprising:
an auxiliary link member provided parallel to the link member, extending from the monitor body to the base member.

26. The monitor according to claim 25, wherein the base bracket further comprises:
a base combining part provided to a bottom portion of the base bracket, to support the monitor main body;
a first link support provided to a top portion of the base bracket to rotatably support the auxiliary link member; and
a stopper accommodation part to accommodate a stopper.

27. The monitor according to claim 2, wherein the base bracket further comprises:
a pair of base brackets.

28. The monitor according to claim 27, wherein the link member is rectangular-shaped.

29. The monitor according to claim 28, wherein the stopper is provided on the at least one of the pair of base brackets.

30. The monitor according to claim 27, wherein the base hinge further comprises:
a pair of first hinge axes rotatably combined to the lower part of the link member and the pair of base brackets; and
a twisting coil spring having a first end combined to the link member and a second end combined to the pair of base brackets.

31. The monitor according to claim 30, wherein the elastic force of the twisting coil spring is equal to force due to a weight of the monitor body combined to the link member.

32. The monitor according to claim 26, wherein the monitor hinge further comprises:
a second link support combined to the auxiliary link member and rotatably combined to a first side of the upper part of the link member;
a second hinge axis rotatably combined to the first side of the link support and a first side of the main body bracket; and
a rotating shaft provided to a second side of the main body bracket and rotatably combined to a rotating shaft support provided to a second side of the upper part of the link member.

33. The monitor according to claim 32, further comprising:
a support accommodation part provided to the first side of the upper part of the link member to rotatably support the link support.

34. A monitor supporting apparatus for a monitor body, comprising:
a base member;
a link member provided between the monitor body and the base member;
a base hinge to rotatably connect the link member and the base member and enable the link member to rotate relative to a surface of the base member, the base hinge having a base hinge axis;
a monitor hinge, spaced from the base hinge, to rotatably combine the link member and the monitor body;

a rotating limiter, provided between the link member and the base member, to prevent a lower part of the monitor body from making contact with the base member when the link member rotates against the base member; and a pivoting hinge to pivotably combine the monitor body and the monitor hinge to enable the monitor body to pivot relative to the monitor hinge, the pivoting hinge having a pivoting hinge axis transverse with respect to the base hinge axis.

35. The monitor supporting apparatus according to claim 34, further comprising:

a base bracket, combined to the base member and the base hinge, to support the base hinge.

36. The monitor supporting apparatus according to claim 35, wherein the rotating limiter further comprises:

a stopping protrusion provided on the link member; and a stopper provided on the base bracket, to make contact with the stopping protrusion to stop rotation of the link member.

37. The monitor supporting apparatus according to claim 36, wherein the base bracket further comprises:

a stopper accommodation part to support the stopper when the stopper enters and exits the stopper accommodation part; and an elastic member provided between the stopper and the stopper accommodation part to elastically push the stopper provided between the stopper and the stopper accommodation part.

38. The monitor supporting apparatus according to claim 37, wherein the stopping protrusion surmounts an elastic force of the elastic member to enable the link member to rotate to a position parallel to the surface of the base member when the link member is pushed and the stopping protrusion makes contact with the stopper.

39. The monitor supporting apparatus according to claim 34, further comprising:

a main body bracket provided between the pivoting hinge and the monitor hinge, wherein a first side of the main body bracket is combined to the monitor hinge to enable the monitor body to rotate relative to the link member, and a second side of the main body bracket is combined to the pivoting hinge to enable the monitor body to pivot relative to the main body bracket.

40. The monitor supporting apparatus according to claim 39, wherein the pivoting hinge further comprises:

a monitor bracket having a first side combined to the monitor body;

a pivoting shaft that protrudes away from the monitor body provided to a second side of the monitor; and a pivoting bracket having a first part formed with a shaft accommodation part pivotably combined with the pivoting shaft, and a second part combined with the main body bracket.

41. The monitor supporting apparatus according to claim 40, wherein the pivoting hinge further comprises:

a pivoting angle limiter to limit a pivoting angle range of the monitor bracket relative to the pivoting bracket.

42. The monitor supporting apparatus according to 41, wherein the pivoting angle limiter further comprises:

a protrusion protruding backward from the monitor bracket; and a protrusion guiding part provided to the pivoting bracket, to pivotably guide the protrusion within a predetermined angle range.

43. The monitor supporting apparatus according to claim 35, further comprising:

an auxiliary link member provided parallel to the link member, extending from the monitor main body to the base member.

44. The monitor supporting apparatus according to claim 43, wherein the base bracket further comprises:

a base combining part provided to a bottom portion of the base bracket, to support the monitor main body;

a first link support provided to a top portion of the base bracket to rotatably support the auxiliary link member; and a stopper accommodation part to accommodate a stopper.

* * * * *

UNITED STATES PATENT AND TRADEMARK OFFICE
CERTIFICATE OF CORRECTION

| | |
|---|---|
| PATENT NO. | : 7,424,994 B2 |
| APPLICATION NO. | : 10/912291 |
| DATED | : September 16, 2008 |
| INVENTOR(S) | : Jun-soo Jeong |

It is certified that error appears in the above-identified patent and that said Letters Patent is hereby corrected as shown below:

Column 10, Line 35, change "ofbase" to --of base--.

Column 11, Line 3, change "bodyfrom" to --body from--.

Signed and Sealed this

Third Day of February, 2009

JOHN DOLL
*Acting Director of the United States Patent and Trademark Office*